United States Patent
Katto

[19]
[11] Patent Number: 6,072,832
[45] Date of Patent: Jun. 6, 2000

[54] AUDIO/VIDEO/COMPUTER GRAPHICS SYNCHRONOUS REPRODUCING/ SYNTHESIZING SYSTEM AND METHOD

[75] Inventor: Jiro Katto, Tokyo, Japan

[73] Assignee: NEC Corporation, Tokyo, Japan

[21] Appl. No.: 08/957,587

[22] Filed: Oct. 24, 1997

[30] Foreign Application Priority Data

Oct. 25, 1996 [JP] Japan ................................ 8-301360

[51] Int. Cl.[7] .................................................. H04N 7/26
[52] U.S. Cl. ....................... 375/240; 348/423; 348/512; 348/518; 348/845.2; 348/845.3; 348/39
[58] Field of Search ........................... 375/240; 348/423, 348/845.3, 845.2, 512, 518, 39; H04N 7/26

[56] References Cited

U.S. PATENT DOCUMENTS

| | | | |
|---|---|---|---|
| 5,774,206 | 6/1998 | Wasserman | 709/247 |
| 5,812,791 | 9/1998 | Wasserman | 709/247 |
| 5,896,140 | 4/1999 | O'Sullivan | 345/508 |
| 5,933,597 | 8/1999 | Hogan | 709/204 |
| 5,949,436 | 9/1999 | Horan | 345/501 |

FOREIGN PATENT DOCUMENTS 7-212653  8/1995  Japan .

OTHER PUBLICATIONS

"Geometry Compression", by Michael Deering, Sun Microsystems, pp. 13–20, 1995.

ISO/IEC JTCI/SC29/WG11N0801, Nov. 13, 1994.

ISO/IEC WD 14772: :"The Virtual Reality Modeling Language Specification: The VRML2.0 Specification" (VRML), Jul. 15, 1996.

*Primary Examiner*—Howard Britton
*Attorney, Agent, or Firm*—Foley & Lardner

[57] ABSTRACT

In an audio/video/computer graphics data synchronous reproducing/synthesizing system, a demultiplexer separates a bit stream in which an audio signal, a video signal, and computer graphics data are compressed and multiplexed, into compressed audio and video signal streams, audio and video signal time reference values, and a compressed computer graphics data stream. An audio PLL generates a first decoding clock. An audio decoder decodes the audio signal. An audio memory stores the decoded audio signal. A modulator modulates the audio signal in accordance with sound source control information. A video PLL generates a second decoding clock. A video decoder decodes the video signal. A video memory stores the decoded video signal. A CG decoder decodes the computer graphics data and event time management information. A CG memory stores the decoded computer graphics data. An event generator generates an event driving instruction. A detector detects viewpoint movement of an observer. A rendering engine receives the video signal, the computer graphics data, the event driving instruction, and viewpoint movement data and outputs a synthesized image of the video signal and the computer graphics data and the sound source control information. The method for this system is also disclosed.

11 Claims, 17 Drawing Sheets

AUDIO/VIDEO/COMPUTER GRAPHICS SYNCHRONOUS REPRODUCING/ SYNTHESIZING SYSTEM AND METHOD

BACKGROUND OF THE INVENTION

The present invention relates to a system for synchronously reproducing/synthesizing an audio signal, a video signal, and computer graphics data.

Known international coding standards for a system which compresses, codes, and multiplexes an audio signal (or a speech signal) and a video signal, transmits/stores the multiplexed signal, expands the transmitted/stored signal, and decodes it to the original audio and video signals are MPEG1 and MPEG2 defined by the MPEG (Moving Picture Coding Experts Group) in working group (WG) 11 in SC29 under JTC1 (Joint Technical Committee 1) for handling common matters in the data processing field of the ISO (International Organization for Standardization) and IEC (International Electrotechnical Commission).

The MPEG assumes a variety of applications. As for synchronization, systems using phase lock and systems not based on phase lock are assumed.

In synchronization using phase lock, an audio signal coding clock (sampling rate of an audio signal) and a video signal coding clock (frame rate of a video signal) are phase-locked to a common SCR (System Clock Reference).

A time stamp representing time of decoding/reproduction is added to a multiplexed bit stream. A decoding system realizes phase lock and sets a time reference. More specifically, synchronization between the coding system and the decoding system is established. In addition, the audio signal and the video signal are decoded on the basis of the time stamp, thereby realizing reproduction/display of the audio signal and the video signal which are synchronized with each other.

When phase lock is not employed, the audio signal and the video signal are independently processed and decoded in accordance with corresponding time stamps added by the coding system.

FIG. 16 shows the configuration of a system for reproducing/displaying an audio signal and a video signal from an MPEG system stream based on phase lock, which is described in ISO/IEC 13818-1, "Information Technology-Generic Coding of Moving Pictures and Associated Audio Systems", November 1994.

Referring to FIG. 16, a demultiplexer 1 separates a bit stream in which an audio signal and a video signal are compressed and multiplexed in accordance with the MPEG standard, into a compressed audio signal stream, a time stamp, the SCR (System Clock Reference) or PCR (Program Clock Reference) of the audio signal, a compressed video signal stream, a time stamp, and the SCR or PCR of the video signal.

An audio buffer 2 buffers the compressed audio signal stream separated by the demultiplexer 1. An audio PLL (Phase Locked Loop) 3 receives the SCR/PCR of the audio signal separated by the demultiplexer 1 and generates a decoding clock. An audio signal decoder 4 decodes the compressed audio signal stream from the audio buffer 2 at a timing indicated by the time stamp of the audio signal in accordance with the decoding clock supplied from the audio PLL 3. An audio memory 5 stores the decoded audio signal supplied from the audio signal decoder 4 and outputs the audio signal.

A video buffer 7 buffers the compressed video signal stream separated by the demultiplexer 1. A video PLL 8 receives the SCR/PCR of the video signal separated by the demultiplexer 1 and generates a decoding clock. A video signal decoder 9 decodes the compressed video signal stream from the video buffer 7 at a timing indicated by the time stamp of the video signal in accordance with the decoding clock supplied from the video PLL 8. A video memory 10 stores the decoded video signal supplied from the video signal decoder 9 and outputs the video signal.

The audio PLL 3 and the video PLL 8 control the oscillation frequency such that the SCR/PCR of the coding system, which is supplied from the demultiplexer 1, matches the timer counter value of the STC (System Time Clock) of the audio PLL 3 and the video PLL 8. With this processing, the time reference of the decoding system is set, and synchronization between the coding system and the decoding system is established.

Next, the audio signal and the video signal are decoded at the timing indicated by the time stamp, thereby realizing synchronous reproduction/display of the audio signal and the video signal.

Along with recent development of the computer and LSI technologies, computer graphics (CG) is popularly used in various fields. Accordingly, attempts for integrating an audio signal (or a speech signal), a video signal, and computer graphics data and transmitting/storing the integrated data have been extensively made.

As shown in FIG. 15, a coding system 24 receives an audio signal, a video signal, and computer graphics data, codes these data, multiplexes these data or independently outputs these data to a transmission system/storage system 25.

A decoding system 26 extracts the integrated data from the transmission system/storage system 25, decodes the data, and outputs the audio signal and integrated image data of the video signal and computer graphics. Interaction from the observer using a pointing device such as a mouse or a joystick, e.g., viewpoint movement in a three-dimensional space on the display screen is received. A typical exarple is ISO/IEC WD 14772: "The Virtual Reality Modeling Language Specification: The VRML2.0 Specification"(VRML).

The VRML is a description language for transmitting/ receiving CG data through a network represented by the Internet and forming/sharing a virtual space. The VRML supports ISO/IEC 11172 (MPEG1) which is standardized as an audio/video signal coding standard. More specifically, on the coding system side, the MPEG1 stream used the in VRML description, the sound source position of an audio signal, and a three-dimensional object on which a video signal is mapped are designated. On the decoding system side, a three-dimensional space is formed in accordance with the received VRML description, the audio sound source and the video object are arranged in the three-dimensional space, and the audio signal and the video signal are synchronously reproduced/displayed in accordance with time stamp information contained in the MPEG1 stream.

The VRML also supports an animation of a three-dimensional object. More specifically, on the coding system side, the start and end times of each event, the duration of one cycle, the contents of each event, and interaction between events are described in a script. On the decoding system side, a three-dimensional space is formed in accordance with the received VRML description, events are generated on the basis of unique time management, and an animation is displayed.

Alternatively, on the coding system side, time ti and parameters Xi (color, shape, normal vector, direction, position, and the like) of the object at the time ti are described and defined. On the decoding system side, the parameters of the object at time t ($t_1 < t < t_{i+1}$) are obtained by interpolation, and an animation is displayed.

For the VRML, a binary format replacing the conventional script description has also been examined. This enables reduction of redundancy of a script description or shortening of the processing time for converting the script description into a high-speed rendering format on the decoding system, thereby improving the transmission efficiency and realizing high-speed three-dimensional display.

A description in, e.g., M. Deering, "Geometry Compression", Computer Graphics Proceedings, Annual Conference Series, pp. 13–20, Aug. 1995 can be referred to as a means for reducing redundancy of a script description. An efficient system for compressing vertex data expression for describing a three-dimensional object is described in this reference.

FIG. 17 shows the arrangement of a conventional decoding system (in the VRML, this system is normally called a "browser") for receiving the VRML description and displaying the three-dimensional space. Conventional decoding systems of this type are, e.g., "Live3D" available from Netscape, "CyberPassage" available from Sony, and "WebSpace" available from SGI which are opened to the public through the Internet.

Referring to FIG. 17, an AV buffer 21 buffers a bit stream in which an audio signal and a video signal are compressed and multiplexed. The demultiplexer 1 separates the bit stream in which the audio signal and the video signal are compressed and multiplexed, which is supplied from the AV buffer 21, into a compressed audio signal stream and a compressed video signal stream.

The audio signal decoder 4 decodes the compressed audio signal stream supplied from the demultiplexer 1. The audio memory 5 stores the decoded audio signal supplied from the audio signal decoder 4 and outputs the audio signal. A modulator 6 modulates the audio signal from the audio memory 5 on the basis of a viewpoint, the viewpoint moving speed, the sound source position, and the sound source moving speed, which are supplied from a rendering engine 15.

The video signal decoder 9 decodes the compressed video signal stream supplied from the demultiplexer 1. The video memory 10 stores the decoded video signal supplied from the video signal decoder 9.

A CG buffer 22 buffers a compressed computer graphics data stream (or a normal stream). A CG decoder 12 decodes the compressed computer graphics data stream supplied from the CG buffer 22 and generates decoded computer graphics data, and at the same time, outputs event time management information. A CG memory 13 stores the decoded computer graphics data supplied from the CG decoder 12 and outputs the computer graphics data.

An event generator 14 determines reference time on the basis of a clock supplied from a system clock generator 20 and outputs an event driving instruction in accordance with the event time management information (e.g., a time stamp) supplied from the CG decoder 12.

The rendering engine 15 receives the video signal supplied from the video memory 10, the computer graphics data supplied from the CG memory 13, the event driving instruction supplied from the event generator 14, and viewpoint movement data supplied from a viewpoint movement detector 17 and outputs the viewpoint, the viewpoint moving speed, the sound source position, the sound source moving speed, and the synthesized image of the video signal and the computer graphics data.

A video/CG memory 16 stores the synthesized image of the video signal and the computer graphics data and outputs the synthesized image. The viewpoint movement detector 17 receives a user input from a pointing device such as a mouse or a joystick and outputs it as viewpoint movement data.

Synchronization among the audio signal, the video signal, and the computer graphics data is realized by reproducing/displaying them using, as reference time, the system clock in the decoding system in accordance with the time stamp or event generation timing, as in synchronization not based on phase lock in the MPEG.

A synthesizing system for synchronizing a video signal and a computer graphics image is proposed in Japanese Patent Laid-Open No. 7-212653. This conventional synthesizing system delays a fetched video signal by a time required for generation of a computer graphics image, thereby realizing synchronous synthesis/display of the video signal and the computer graphics data.

In the conventional audio signal/video signal synthesizing/reproducing system shown in FIG. 16, processing of computer graphics data is not mentioned at all.

In addition, the conventional audio signal/video signal/computer graphics data synthesizing/reproducing system shown in FIG. 17 assumes only synchronization without phase lock, and a method of establishing synchronization between the coding system and the decoding system is not referred to.

In FIG. 17, a preprocessing section 23 enclosed by a broken line operates asynchronously with the coding system and writes decoding results in the corresponding memories 5, 10, and 13.

Reproduction of the audio and video signals read out from the memories and the animation of the computer graphics data based on an event driving instruction are executed using the system clock unique to the decoding system as reference time.

The conventional decoding system (VRML browser) fetches all audio/video/computers graphics mixed data in advance, and starts audio reproduction, video reproduction, and animation of the computer graphics data based on an event driving instruction after all decoding results are written in the memories.

For this reason, this system can hardly cope with an application to a communication/broadcasting system which continuously transfers data. In addition, since all processing operations depend on the system clock unique to the decoding system, synchronous reproduction becomes hard when the transfer delay varies.

The system proposed in Japanese Patent Laid-Open No. 7-212653 has the following problems.

(1) The system does not cope with an audio signal.

(2) The system does not cope with compression.

(3) The system does not separately consider the coding system and the decoding system.

SUMMARY OF THE INVENTION

It is an object of the present invention to provide an audio/video/computer graphics synchronous reproducing/synthesizing system for synchronizing an audio signal, a video signal, and computer graphics data.

In order to achieve the above object, according to the present invention, there is provided an audio/video/ computer graphics data synchronous reproducing/ synthesizing system comprising separation means for separating a bit stream in which an audio signal, a video signal, and computer graphics data are compressed and multiplexed, into a compressed audio signal stream, an audio signal time reference value, a compressed video signal stream, a video signal time reference value, and a compressed computer graphics data stream, first clock generation means for generating a first decoding clock on the basis of the audio signal time reference value from the separation means, first decoding means for decoding the audio signal from the compressed audio signal stream from the separation means and the first decoding clock from the first clock generation means, first storage means for storing the decoded audio signal from the first decoding means, modulation means for modulating the audio signal from the first storage means in accordance with sound source control information, second clock generation means for generating a second decoding clock on the basis of the video signal time reference value from the separation means, second decoding means for decoding the video signal from the compressed video signal stream from the separation means and the second decoding clock from the second clock generation means, second storage means for storing the decoded video signal from the second decoding means, third decoding means for decoding the computer graphics data and event time management information from the compressed computer graphics data stream from the separation means, third storage means for storing the decoded computer graphics data from the third decoding means, event generation means for generating an event driving instruction on the basis of the second decoding clock from the second clock generation means and the event time management information from the third decoding means, detection means for detecting viewpoint movement of an observer using a pointing device, and rendering means for receiving the video signal stored in the second storage means, the computer graphics data stored in the third storage means, the event driving instruction from the event generation means, and viewpoint movement data from the detection means, and outputting a synthesized image of the video signal and the computer graphics data and the sound source control information used by the modulation means.

DESCRIPTION OF THE PREFERRED
EMBODIMENTS

The present invention will be described below in detail with reference to the accompanying drawings.

[First Embodiment]

Figure 1:
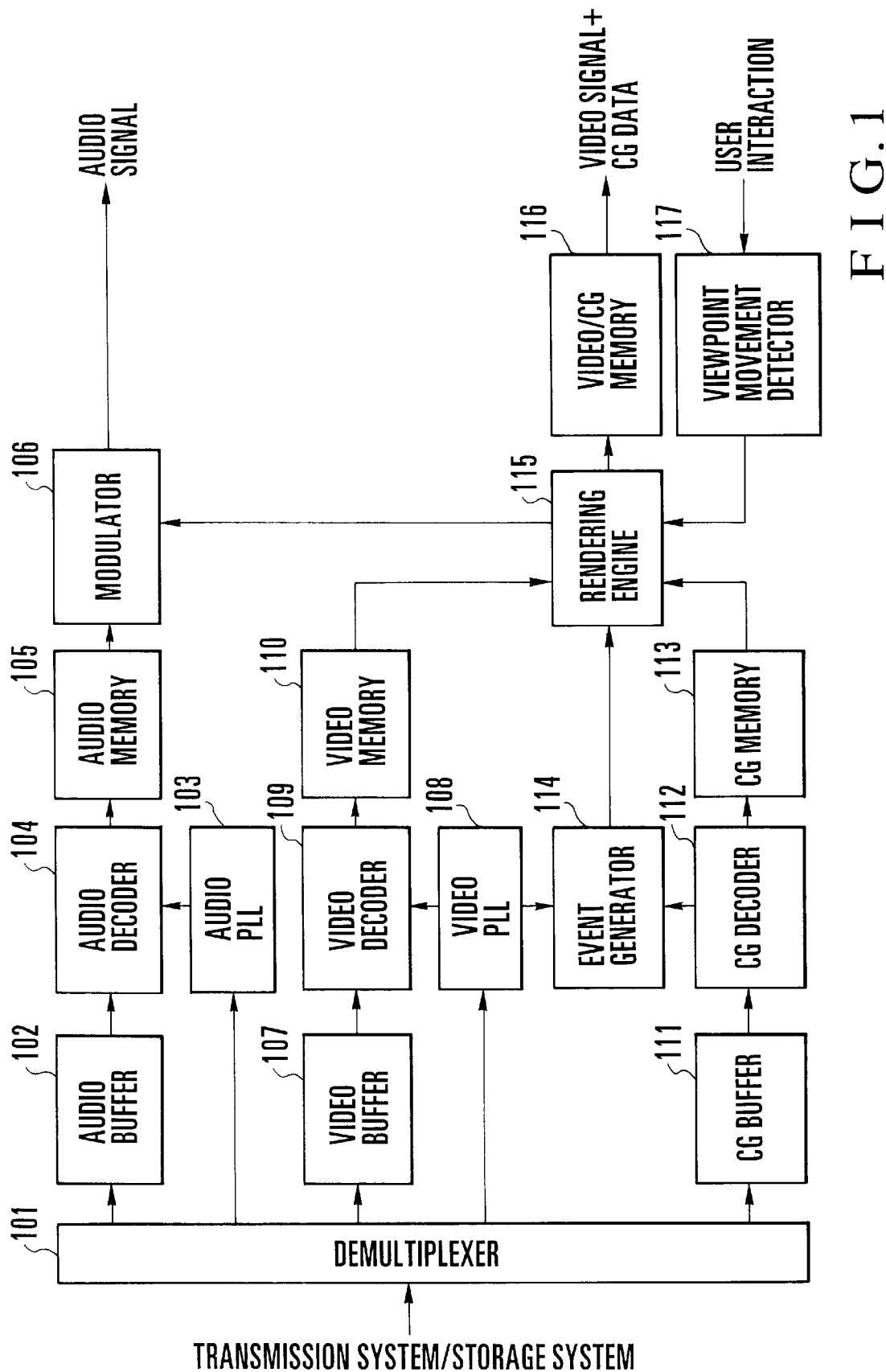
FIG. 1 is a block diagram of a synchronous reproducing/ synthesizing system according to the first embodiment of the present invention.

FIG. 1 shows a synchronous reproducing/synthesizing system according to the first embodiment of the present invention. Referring to FIG. 1, the decoding system in the system of the first embodiment comprises a demultiplexer 101, an audio buffer 102, an audio PLL 103, an audio decoder 104, an audio memory 105, a modulator 106, a video buffer 107, a video PLL 108, a video decoder 109, a video memory 110, a CG buffer 111, a CG decoder 112, a CG memory 113, an event generator 114, a rendering engine 115, a video/CG memory 116, and a viewpoint movement detector 117.

The demultiplexer 101 separates a bit stream in which an audio signal, a video signal, and computer graphics data are compressed and multiplexed, into a compressed audio signal stream, a time stamp, the SCR (System Clock Reference) or PCR (Program Clock Reference) of the audio signal, a compressed video signal stream, a time stamp, the SCR or PCR of the video signal, and a compressed computer graphics data stream.

The audio buffer 102 buffers the compressed audio signal stream separated by the demultiplexer 101.

The audio PLL 103 receives the SCR/PCR of the audio signal separated by the demultiplexer 101 and generates a decoding clock.

The audio decoder 104 decodes the compressed audio signal stream from the audio buffer 102 at a timing indicated by the time stamp of the audio signal in accordance with the decoding clock supplied from the audio PLL 103. The audio memory 105 stores the decoded audio signal supplied from the audio decoder 104 and outputs the audio signal. The modulator 106 modulates the audio signal from the audio memory 105 in accordance with the viewpoint, the viewpoint moving speed, the sound source position, and the sound source moving speed which are supplied from the rendering engine 115.

The video buffer 107 buffers the compressed video signal stream separated by the demultiplexer 101.

The video PLL 108 receives the SCR/PCR of the video signal separated by the demultiplexer 101 and generates a decoding clock.

The video decoder 109 decodes the compressed video signal stream from the video buffer 107 at a timing indicated by the time stamp of the video signal in accordance with the decoding clock supplied from the video PLL 108. The video memory 110 stores the decoded video signal supplied from the video decoder 109 and outputs the video signal.

The CG buffer 111 buffers the compressed computer graphics data stream separated by the demultiplexer 101. The CG decoder 112 decodes the compressed computer graphics data stream arid generates decoded computer graphics data, and at the same time, outputs event time management information.

The CG memory 113 stores the decoded computer graphics data supplied from the CG decoder 112 and outputs the computer graphics data. The event generator 114 determines reference time on the basis of the clock supplied from the video PLL 108 and outputs an event driving instruction in accordance with the event time management information (e.g., a time stamp) supplied from the CG decoder 112.

The rendering engine 115 receives the video signal supplied from the video memory 110, the computer graphics data supplied from the CG memory 113, the event driving instruction supplied from the event generator 114, and the viewpoint movement data supplied from the viewpoint movement detector 117 and outputs a viewpoint, a viewpoint moving speed, a sound source position, a sound source moving speed, and the synthesized image of the video signal and the computer graphics data.

The video/CG memory 116 stores the synthesized image of the video signal and the computer graphics data and outputs the synthesized image. The viewpoint movement detector 117 receives a user input from a pointing device such as a mouse or a joystick and outputs it as viewpoint movement data.

Figure 9:
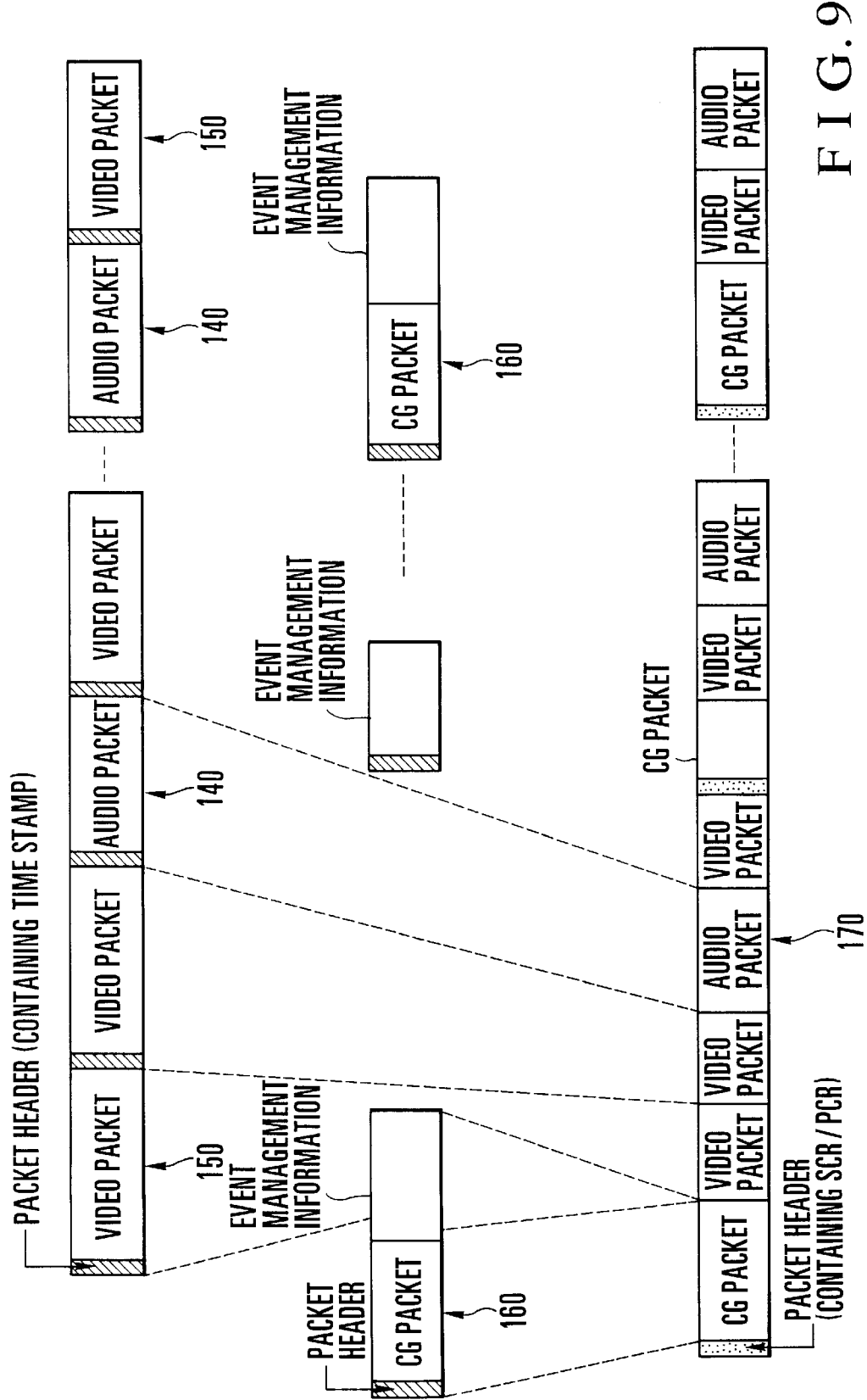
FIG. 9 is a view showing an audio/video/computer graphics multiplexing method.

The operation of the system shown in FIG. 1 will be described next. In the coding system, the compressed streams of an audio signal, a video signal, and computer graphics data are multiplexed, as shown in FIG. 9.

First, the audio signal and the video signal are divided into audio packets 140 and video packets 150 each constituted by compressed data and a header containing a time stamp. The computer graphics data is divided into CG packets 160 each constituted by compressed data (the data is not sometimes compressed), event time management information, and a header. These packets are put into a group, and a pack header containing an SCR or PCR is added to the group to generate a multiplexed stream 170.

In the decoding system shown in FIG. 1, the demultiplexer 101 separates the multiplexed stream 170 into the audio packet 140, the video packet 150, the CG packet 160, and the SCR/PCR again.

The audio packet 140, the video packet 150, and the CG packet 160 are stored in the audio buffer 102, the video buffer 107, and the CG buffer 111, respectively. The SCR/PCR is output to the audio PLL 103 and the video PLL 108 and used to control the oscillation frequency.

The audio decoder 104, the video decoder 109, and the CG decoder 112 decode the compressed data stored in the audio buffer 102, the video buffer 107, and the CG buffer 111, respectively. The decoding results are written in the audio memory 105, the video memory 110, and the CG memory 113, respectively.

For the computer graphics data, event time management information on the time axis is separated by the CG decoder 112 and sent to the event generator 114. The event generator 114 has a function of matching the description format of time used to reproduce the audio signal and the video signal and the description format of time used for event driving of the computer graphics.

In decoding the audio signal and the video signal, the clock frequency sent from the coding system and changing depending on the SCR/PCR and the time stamps contained in the packet headers are used to decode these signals in synchronism with the coding system.

However, the computer graphics data need not always be decoded in this way because the computer graphics is not based on the concept of a sampling rate while the audio signal and the video signal are sampled at a predetermined period on the time axis.

More specifically, in the decoding system, as far as decoding is ended before actual display of the computer graphics, the operation clock of the computer graphics decoder can be arbitrarily sew. Reversely, in the decoding system, decoding of computer graphics data must be ended before the computer graphics data is actually displayed.

The audio signal, the video signal, and the computer graphics data written in the audio memory 105, the video memory 110, and the CG memory 113 respectively are reproduced and synthesized by processing in the modulator 106 and the rendering engine 115.

An interaction from the observer (user) is detected by the viewpoint movement detector 117 through the pointing device such as a mouse and reflected, as viewpoint movement data, to the rendering result from the rendering engine 115. The behavior of an object along the time axis, which is defined by the computer graphics data, is controlled in accordance with an event driving instruction generated from the event generator 114.

Not the system clock of the decoding system but the decoding clock generated by the video PLL 108 is used as reference time of the event generator 114. With this arrangement, the video signal and the computer graphics data are synchronized with each other without being influenced by a transmission delay or jitter.

Figure 10:
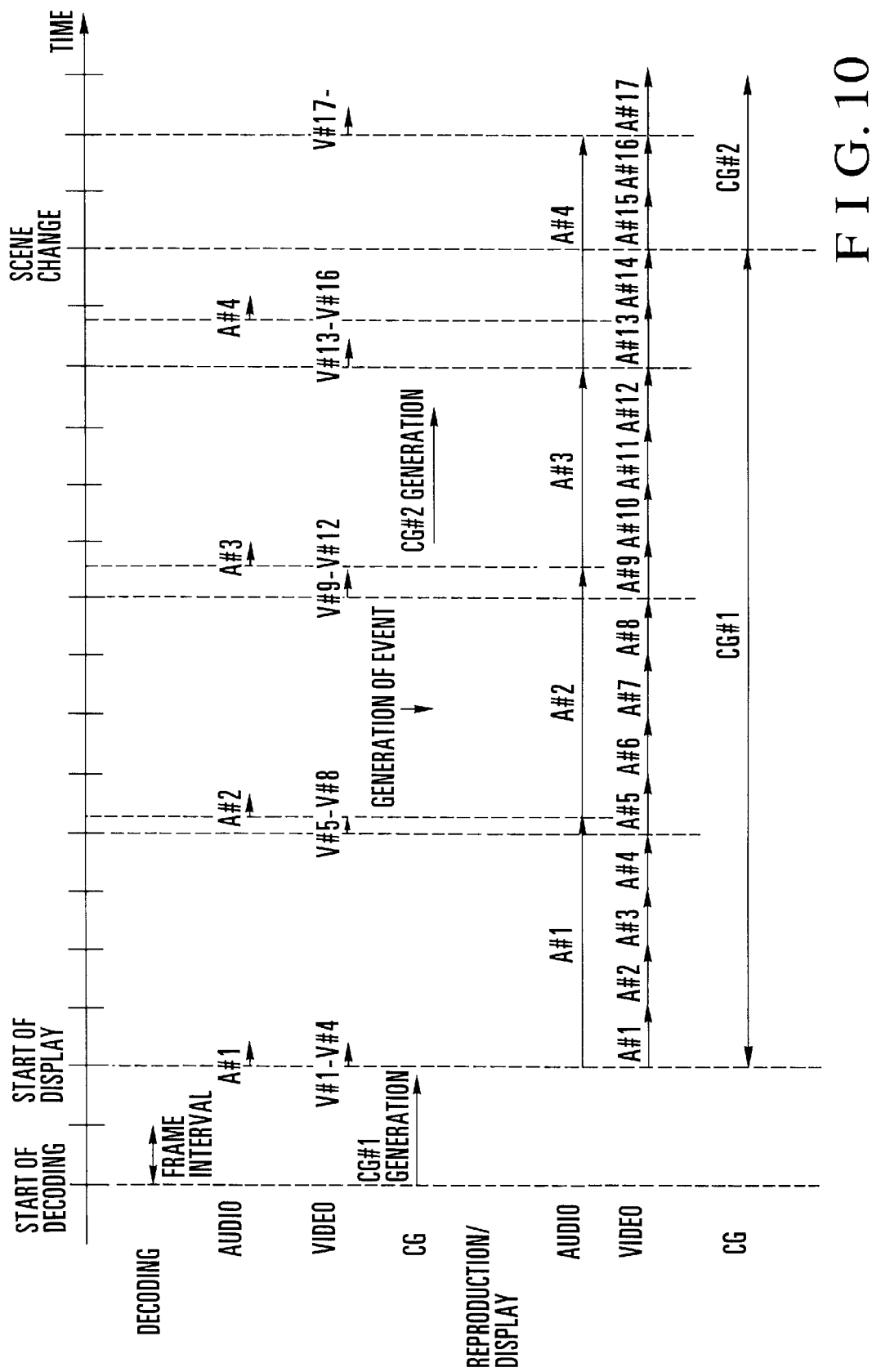
FIG. 10 is a timing chart for explaining the operation of the system shown in FIG. 1.

FIG. 10 shows the flow of decoding and reproduction/display in the first embodiment of the present invention.

Referring to FIG. 10, A#n represents decoding and reproduction of the nth audio signal. V#n represents decoding and reproduction/display of the frame of the nth video signal. CG#n represents decoding and reproduction/display of the scene of the nth computer graphics data.

Decoding of the audio or video signal is started/ended at times defined by the time stamp. FIG. 10 shows a case wherein decoding is complete in a time much shorter than the frame interval. However, decoding which requires a longer time can also be performed by delaying reproduction/display by a predetermined time. In FIG. 10, although the designated times of the time stamps of the audio signal and the video signal are intentionally changed excluding the first decoding, the same time may be set.

On the other hand, decoding of the computer graphics data is started/ended before reproduction/display. Computer graphics is not displayed while the first scene is being decoded. Computer graphics data of the second scene is decoded in the background of display processing of the first scene.

To guarantee the appropriate end time, the timing for multiplexing computer graphics data in the coding system must be taken into consideration. In many cases, computer graphics data is determined in advance. Therefore, when the generation time of the computer graphics data in the decoding system is predicted, the appropriate end time can be easily set unless a scene change frequently occurs.

Reproduction/display is realized in accordance with decoding results while synchronizing the audio signal, the video signal, and the computer graphics data. In the first embodiment of the present invention, however, a delay necessary for rendering is not taken into consideration.

Figure 11:
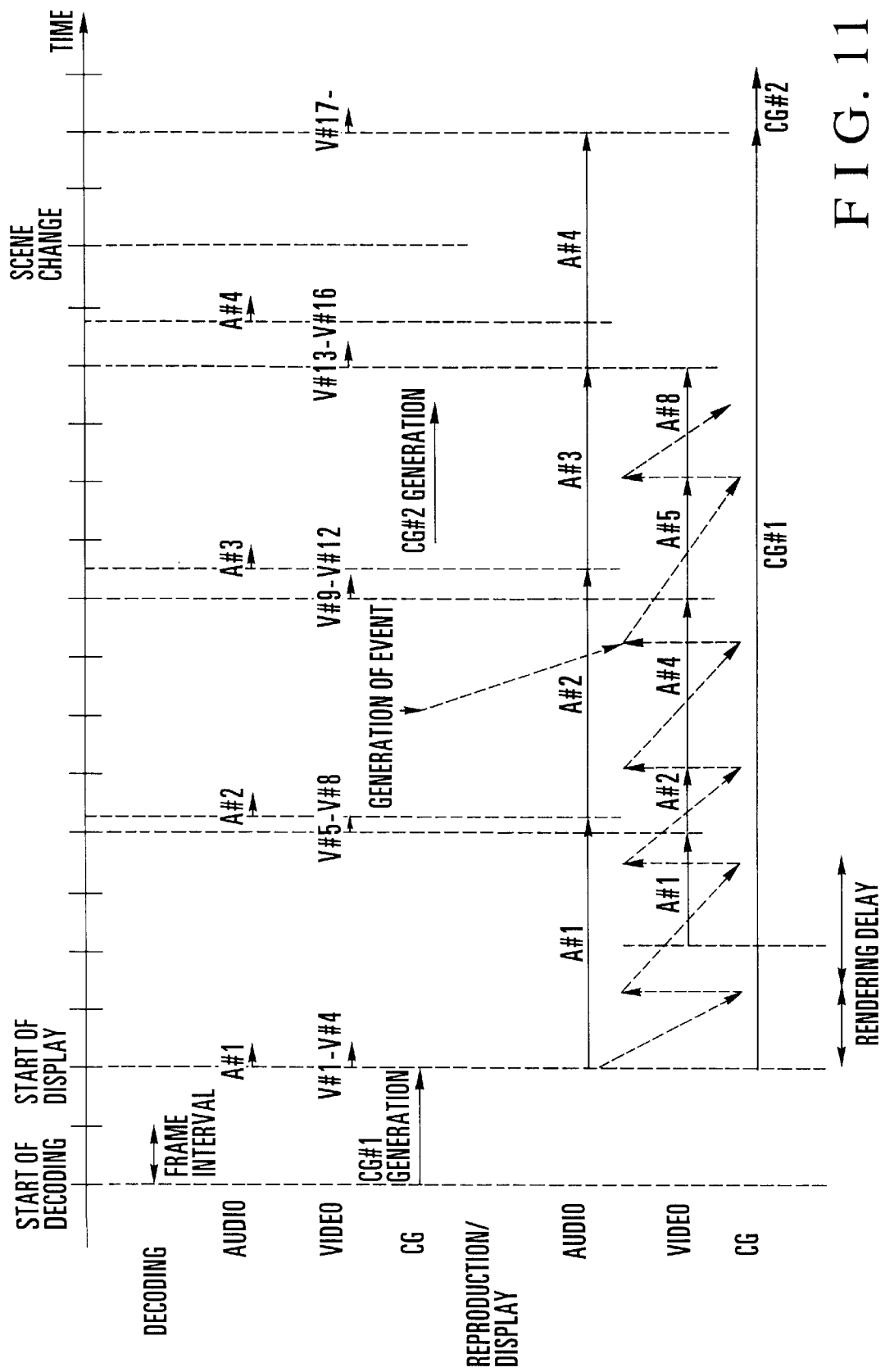
FIG. 11 is a timing chart for explaining influence of rendering delay in the system shown in FIG. 1.

FIG. 11 shows the flow of decoding and reproduction/display considering the rendering delay. In FIG. 11, an operation of performing the first rendering using a video frame to be displayed at a certain time point, starting the second rendering using a video frame to be displayed at the end time of the first rendering, and starting display of a synthesized image at the start of a frame immediately after the end of the first rendering is repeated.

As is apparent from FIG. 11, synchronization between the audio signal and the synthesized image of the video signal/computer graphics data is canceled.

[Second Embodiment]

Figure 2:
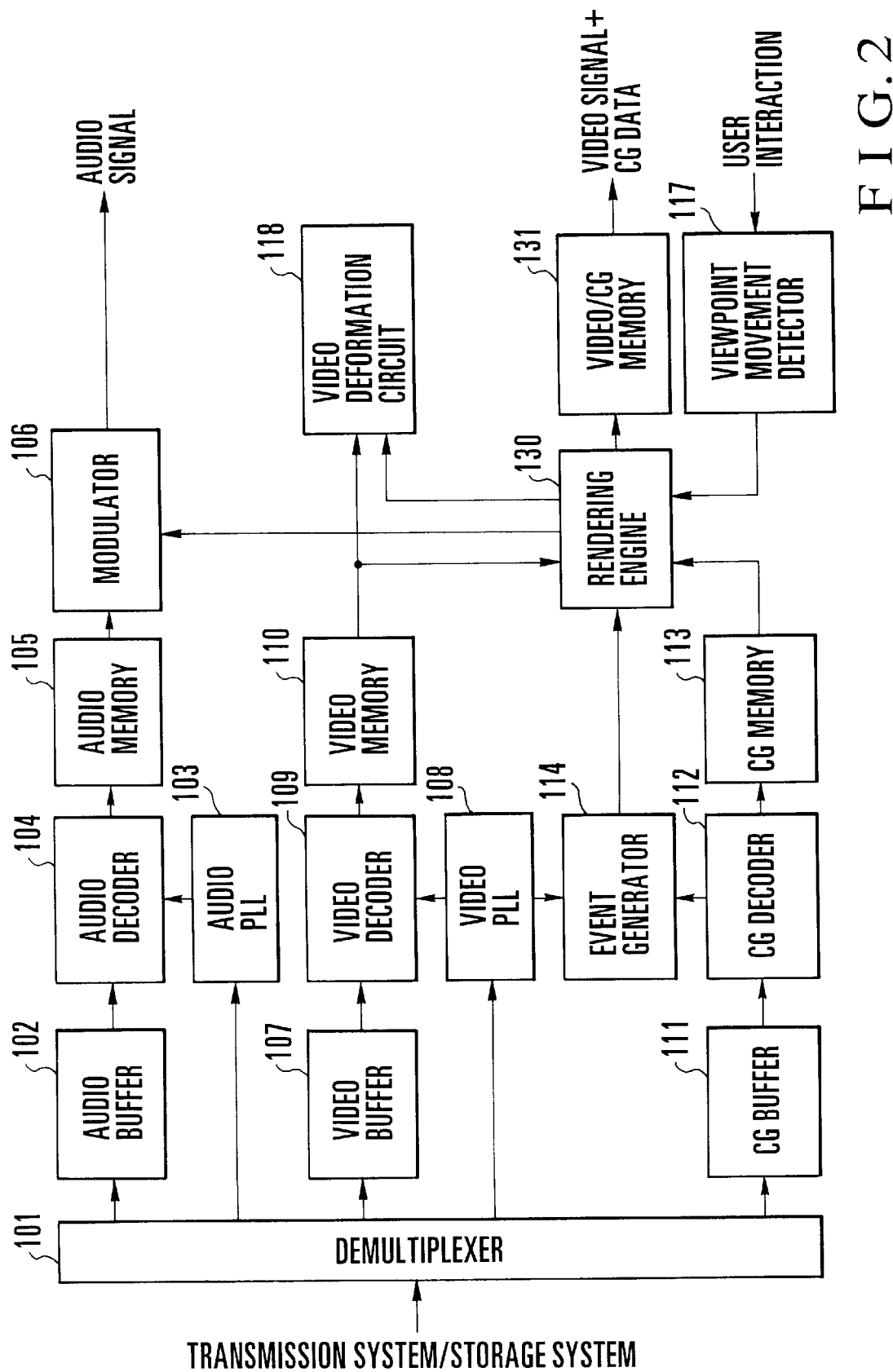
FIG. 2 is a block diagram of a synchronous reproducing/ synthesizing system according to the second embodiment of the present invention.

FIG. 2 shows the system configuration of the second embodiment of the present invention. The same reference numeral as in FIG. 1 denote the same elements in FIG. 2, and a detailed description thereof will be omitted. The difference from the first embodiment shown in FIG. 1 will be mainly described below.

In the system of the second embodiment shown in FIG. 2, a video deformation circuit 118 is added to the first embodiment. In addition, the rendering engine 115 and the video/CG memory 116 are replaced by a rendering engine 130 and a video/CG memory 131, respectively.

The rendering engine 130 has not only the function of the rendering engine 115 but also a function of outputting the two-dimensional projection information of an object on which a video signal is mapped to the video deformation circuit 118. The video deformation circuit 118 deforms the video signal using the video signal supplied from a video memory 110 and the two-dimensional projection information of the object supplied from the rendering engine 130 and outputs the video signal.

The video/CG memory 131 overwrites the output from the video deformation circuit 118, i.e., the deformed video signal on the output from the rendering engine 130, i.e., the synthesized image of the video signal and computer graphics data and stores the data.

The operation of the system shown in FIG. 2 will be described next. The operation of decoding the audio signal, the video signal, and the computer graphics data and writing these data in an audio memory 105, the video memory 110, and a CG memory 113, respectively, is the same as that of the system shown in FIG. 1. The rendering engine 130 additionally has a function of outputting the two-dimensional projection information of the object on which the video signal is mapped.

More specifically, the two-dimensional projection information comprises a set of coordinates of a two-dimensional projection plane of a three-dimensional graphic on which the video signal is mapped and binary data which is given in units of coordinates and has a value of "1" when the projection plane is not hidden by a front object or "0" when the projection plane is hidden by a front object. This data can be easily acquired as a by-product obtained upon applying a well-known hidden surface removal algorithm such as "z-buffer", "depth-sorting" or "binary space-partitioning" in rendering.

The two-dimensional projection information is used by the video deformation circuit 118 to deform the video signal and mask the hidden surface portion. This processing can be realized by using an LSI used in an existing video editor or the like.

The output from the video deformation circuit 118 is overwritten on the synthesized image as a rendering result from the rendering engine 130 immediately before the image is written in the video/CG memory 131, and output as a new synthesized image. When the rendering engine 130 is performing the rendering operation, the video/CG memory 131 enables preferential writing of the output from the video deformation circuit 118.

Figure 12:
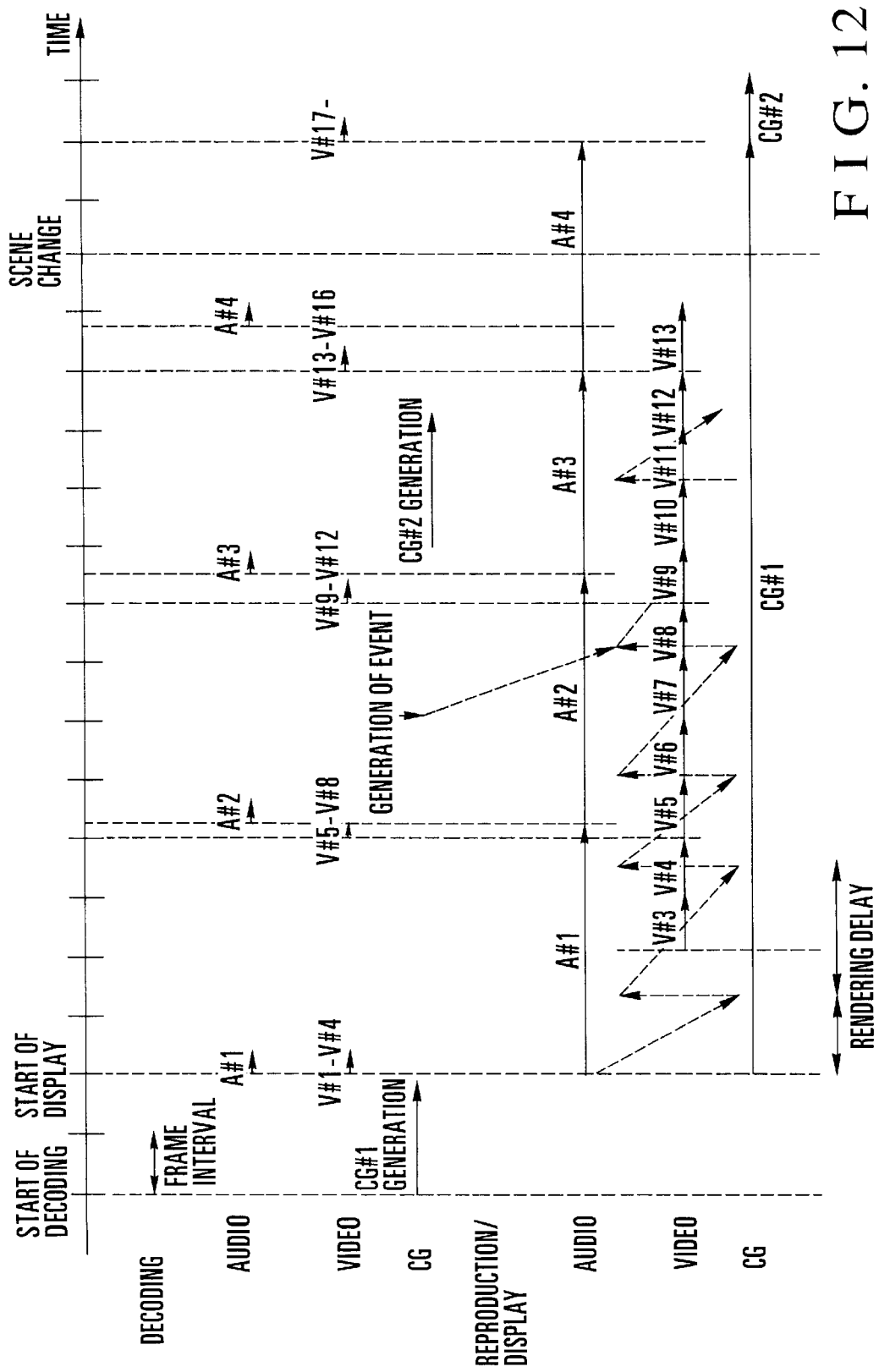
FIG. 12 is a timing chart for explaining the operation of the system shown in FIG. 2.

FIG. 12 shows the flow of decoding and reproduction/display in the system shown in FIG. 2. FIG. 12 is different from FIG. 11 in that the video signal is written in synchronism with the audio signal at the same timing as shown in FIG. 9.

To display the video signal, a video frame to be displayed at the display time is deformed using the two-dimensional projection information given as not the result of rendering which is being performed at the display time but the result of rendering which has been performed immediately before, and overwritten in the video/CG memory 131.

[Third Embodiment]

Figure 3:
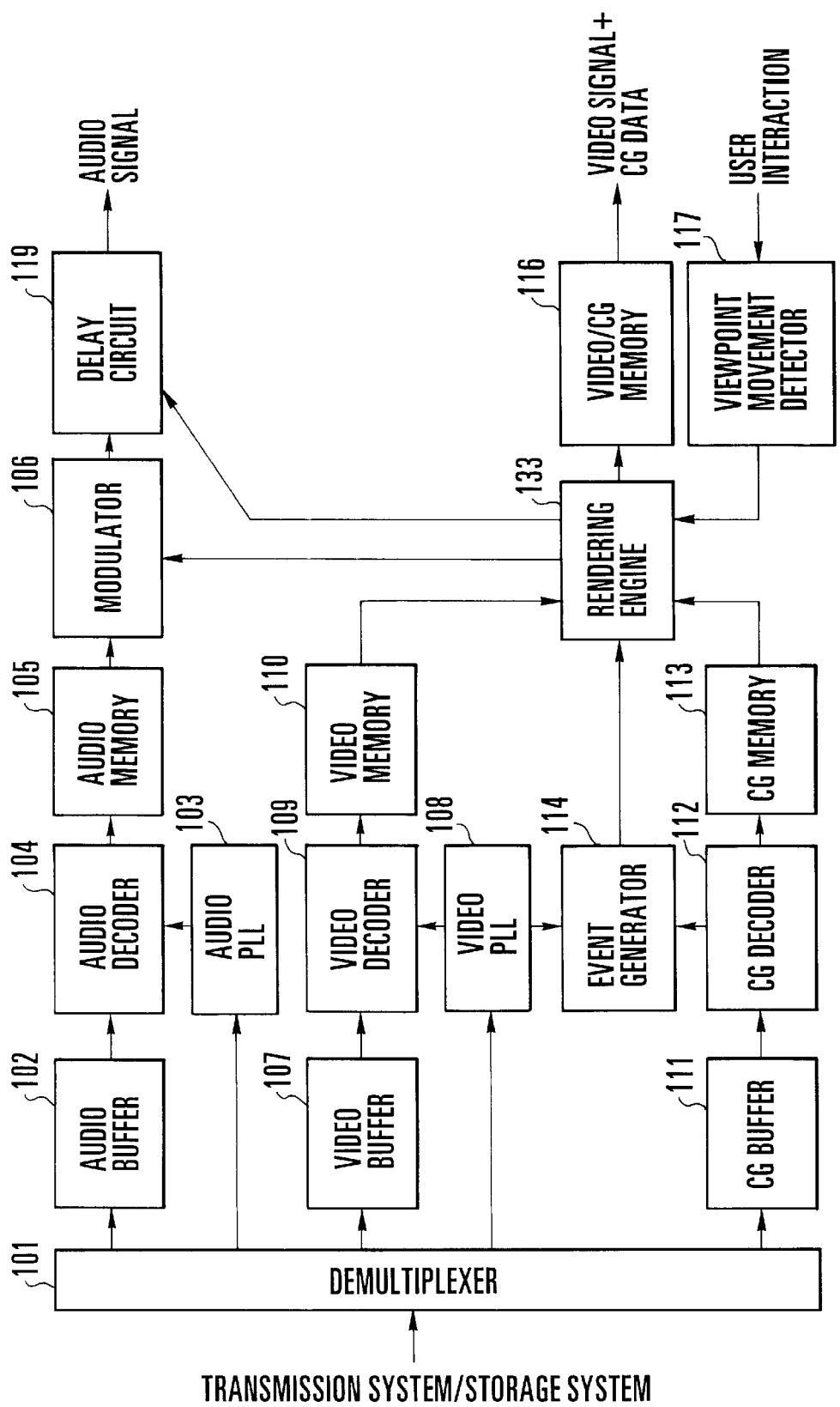
FIG. 3 is a block diagram of a synchronous reproducing/ synthesizing system according to the third embodiment of the present invention.

FIG. 3 shows the system configuration of the third embodiment of the present invention. The same reference numeral as in FIG. 1 denote the same elements in FIG. 3, and a detailed description thereof will be omitted. The difference from the first embodiment shown in FIG. 1 will be mainly described below.

In the system of the third embodiment shown in FIG. 3, a delay circuit 119 is added to the first embodiment shown in FIG. 1. In addition, the rendering engine 115 is replaced by a rendering engine 133. The delay circuit 119 outputs an audio signal, i.e., the output from a modulator 106 in accordance with a rendering delay supplied from the rendering engine 133.

The operation of the system shown in FIG. 3 will be described next. The operation of decoding the audio signal, the video signal, and the computer graphics data and writing these data in an audio memory 105, a video memory 110, and a CG memory 113, respectively, is the same as that of the system shown in FIG. 1. The rendering engine 133 additionally has a function of outputting a rendering delay time. The delay circuit 119 has a function of delaying the audio signal in accordance with the rendering delay time supplied from the rendering engine 133 and outputting the audio signal.

Figure 13:
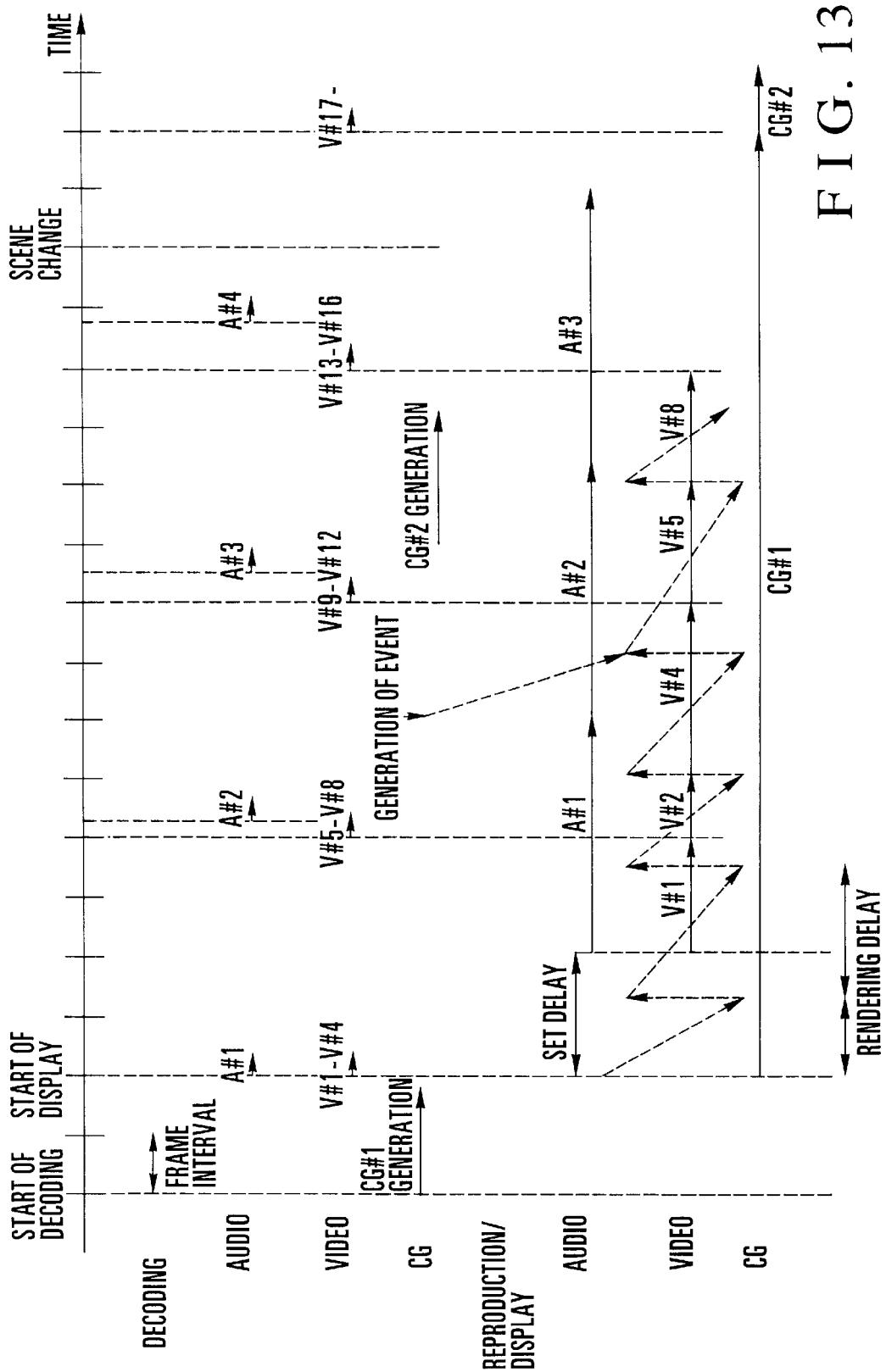
FIG. 13 is a timing chart for explaining the operation of the system shown in FIG. 3.

FIG. 13 shows the flow of decoding and reproduction/display in the system shown in FIG. 3. FIG. 13 is different from FIG. 11 in that the audio signal and the synthesized image of the video signal and the computer graphics data are synchronously reproduced/displayed although some frame thinning takes place in display of the synthesized image.

Setting of the delay time of the audio signal is realized by safely estimating the rendering time of the rendering engine 115.

[Fourth Embodiment]

Figure 4:
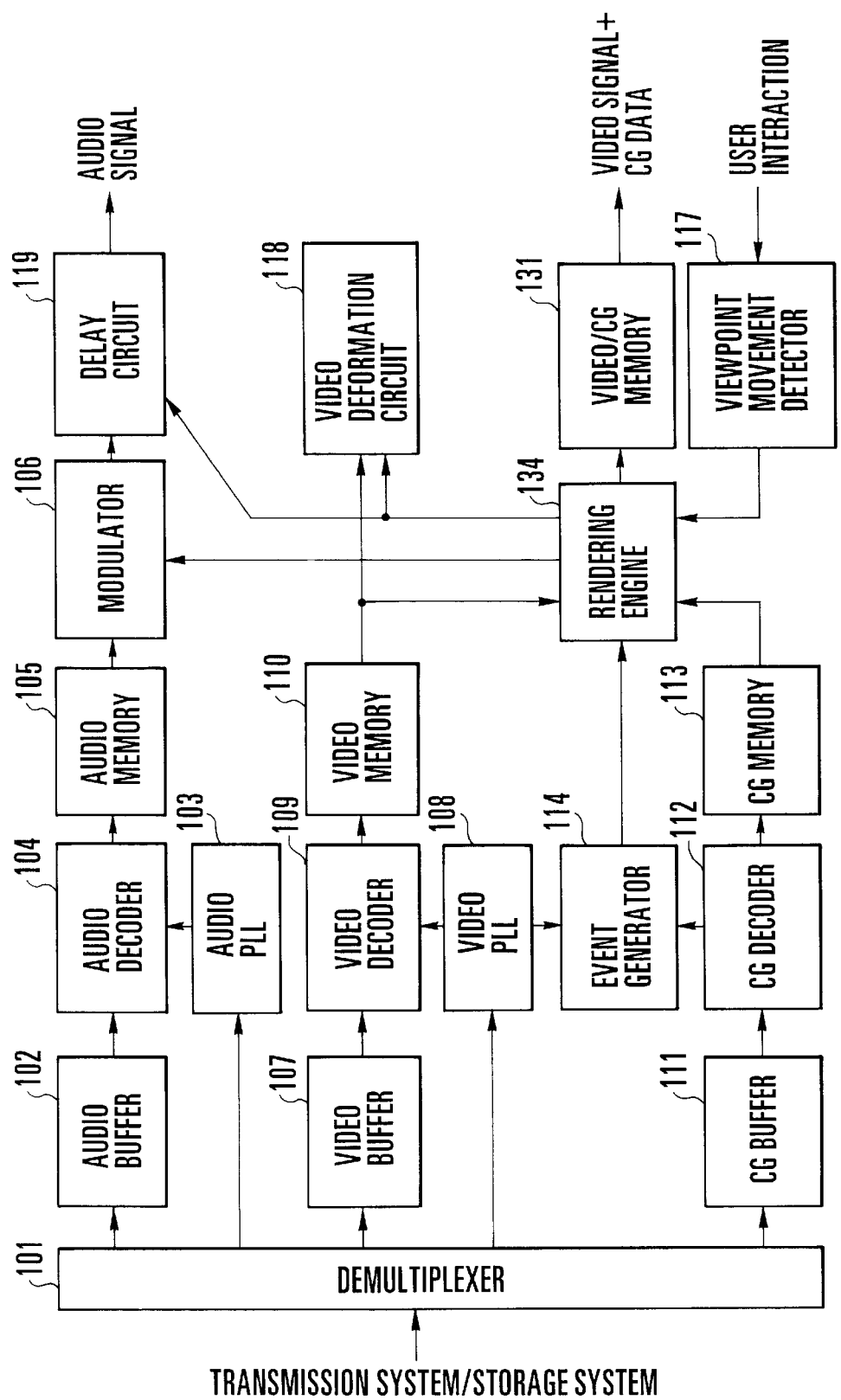
FIG. 4 is a block diagram of a synchronous reproducing/ synthesizing system according to the fourth embodiment of the present invention.

FIG. 4 shows the system configuration of the fourth embodiment of the present invention. The same reference numeral as in FIG. 2 denote the same elements in FIG. 4, and a detailed description thereof will be omitted. The difference from the second embodiment shown in FIG. 2 will be mainly described below.

In the system of the fourth embodiment shown in FIG. 4, a delay circuit 119 is added to the second embodiment shown in FIG. 2. The delay circuit 119 outputs an audio signal, i.e., the output from a modulator 106 on the basis of a predetermined delay. In addition, in the system of the fourth embodiment, the rendering engine 130 shown in FIG. 2 is replaced by a rendering engine 134.

The operation of the system shown in FIG. 4 will be described next. The operation of decoding the audio signal, the video signal, and the computer graphics data and writing these data in an audio memory 105, a video memory 110, and a CG memory 113, respectively, and performing rendering by the rendering engine 134 is the same as that of the system shown in FIG. 2. The delay circuit 119 additionally has a function of delaying the audio signal by a predetermined time and outputting the audio signal.

Figure 14:
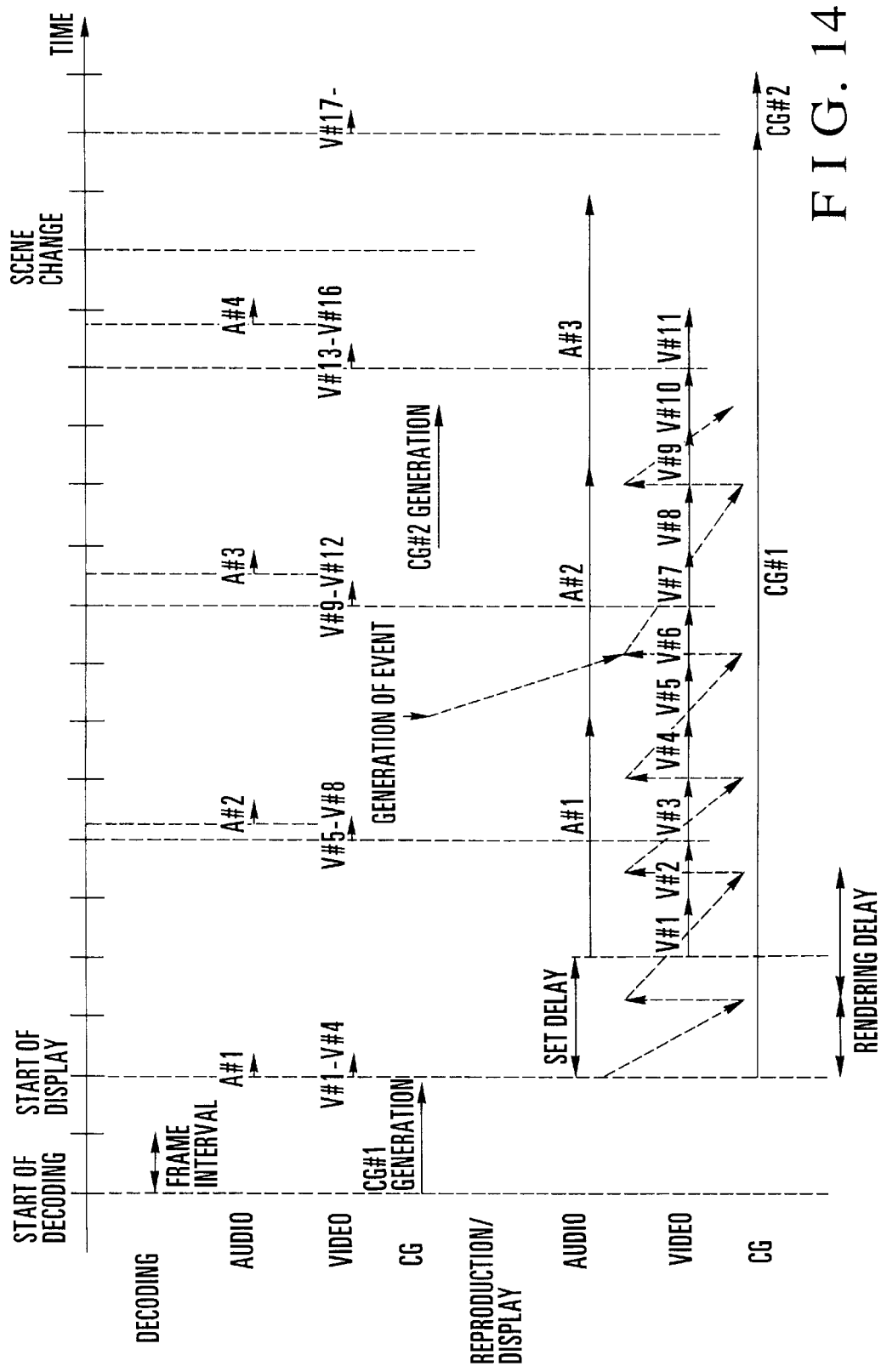
FIG. 14 is a timing chart for explaining the operation of the system shown in FIG. 4.
Figure 15:
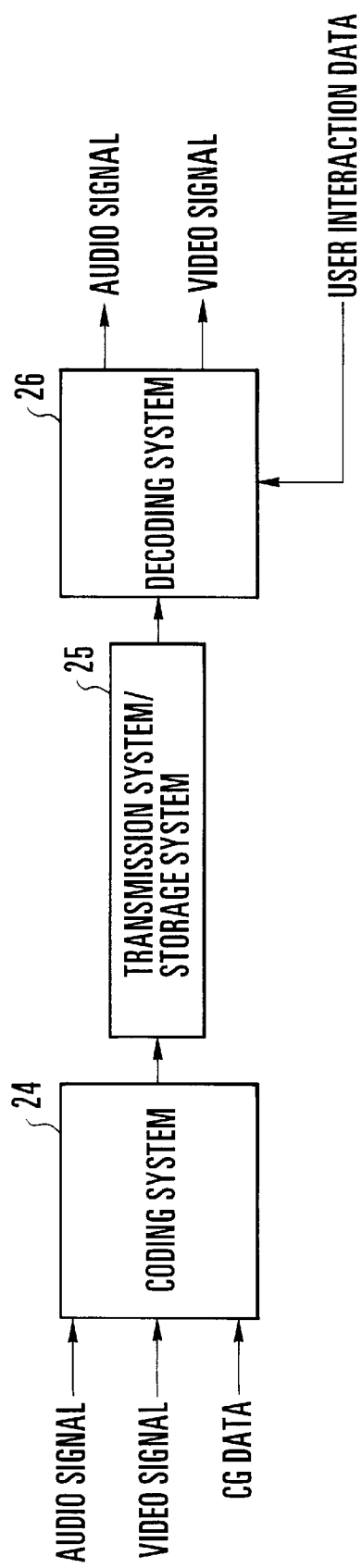
FIG. 15 is a block diagram showing the concept of an audio/video/computer graphics integrated transmission/ storage system.
Figure 16:
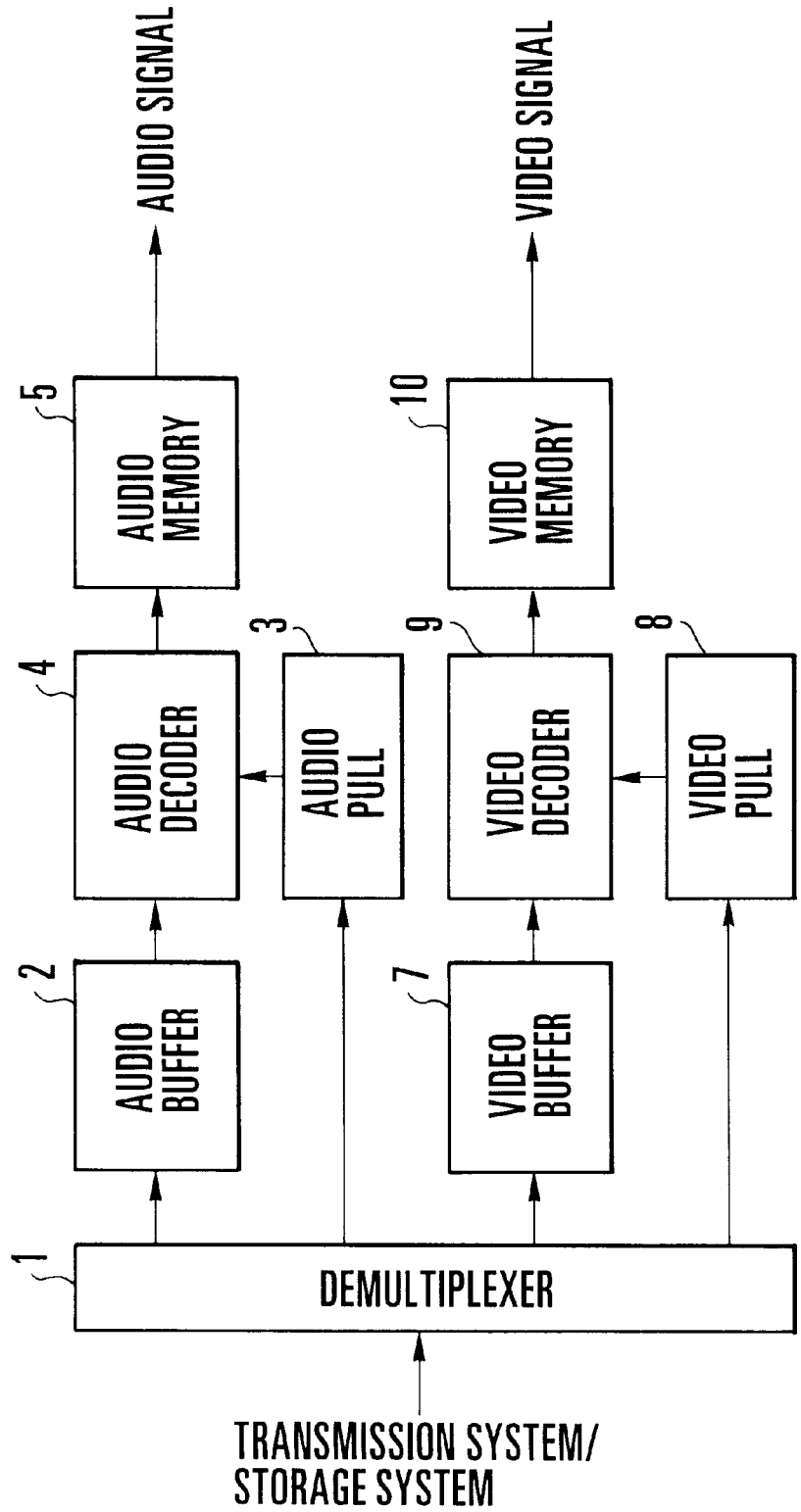
FIG. 16 is a block diagram of a conventional audio/video synchronous reproducing system.
Figure 17:
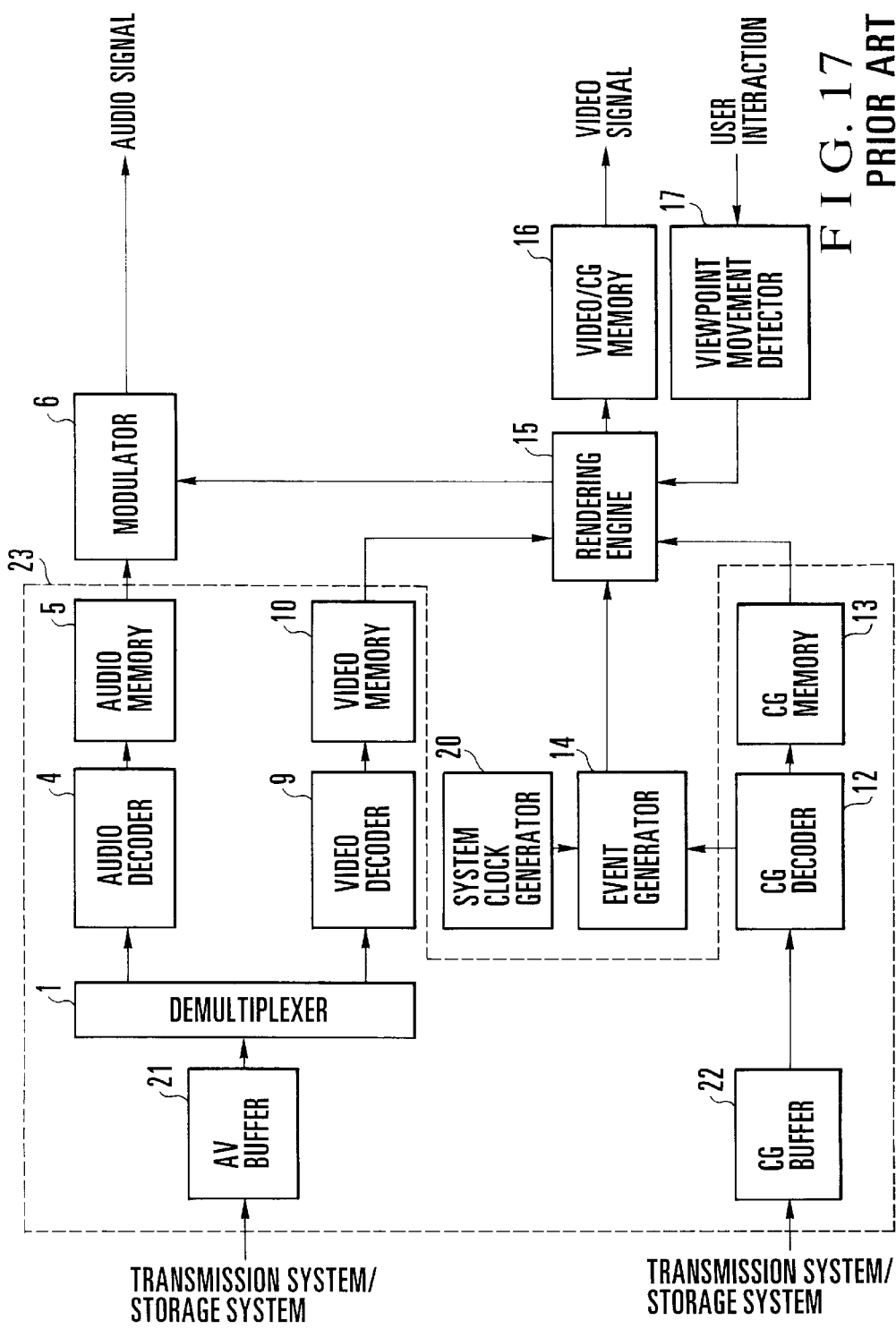
FIG. 17 is a block diagram of a conventional audio/video/ computer graphics synthesizing system.

FIG. 14 shows the flow of decoding and reproduction/display in the system shown in FIG. 4. FIG. 14 is different from FIG. 12 in that the audio signal and the synthesized image of the video signal and the computer graphics data are completely synchronously reproduced/displayed.

Setting of the delay time of the audio signal is realized by adaptively measuring the rendering delay time supplied from the rendering engine 134 or safely estimating the rendering time of the rendering engine 134.

As in the existing VRML, the audio signal and the video signal are decoded from one multiplexed bit stream. However, the computer graphics data is acquired via a route different from that of the audio signal and the video signal. With this processing, synchronous reproduction can be performed in the fourth embodiment, as in the first embodiment.

[Fifth Embodiment]

Figure 5:
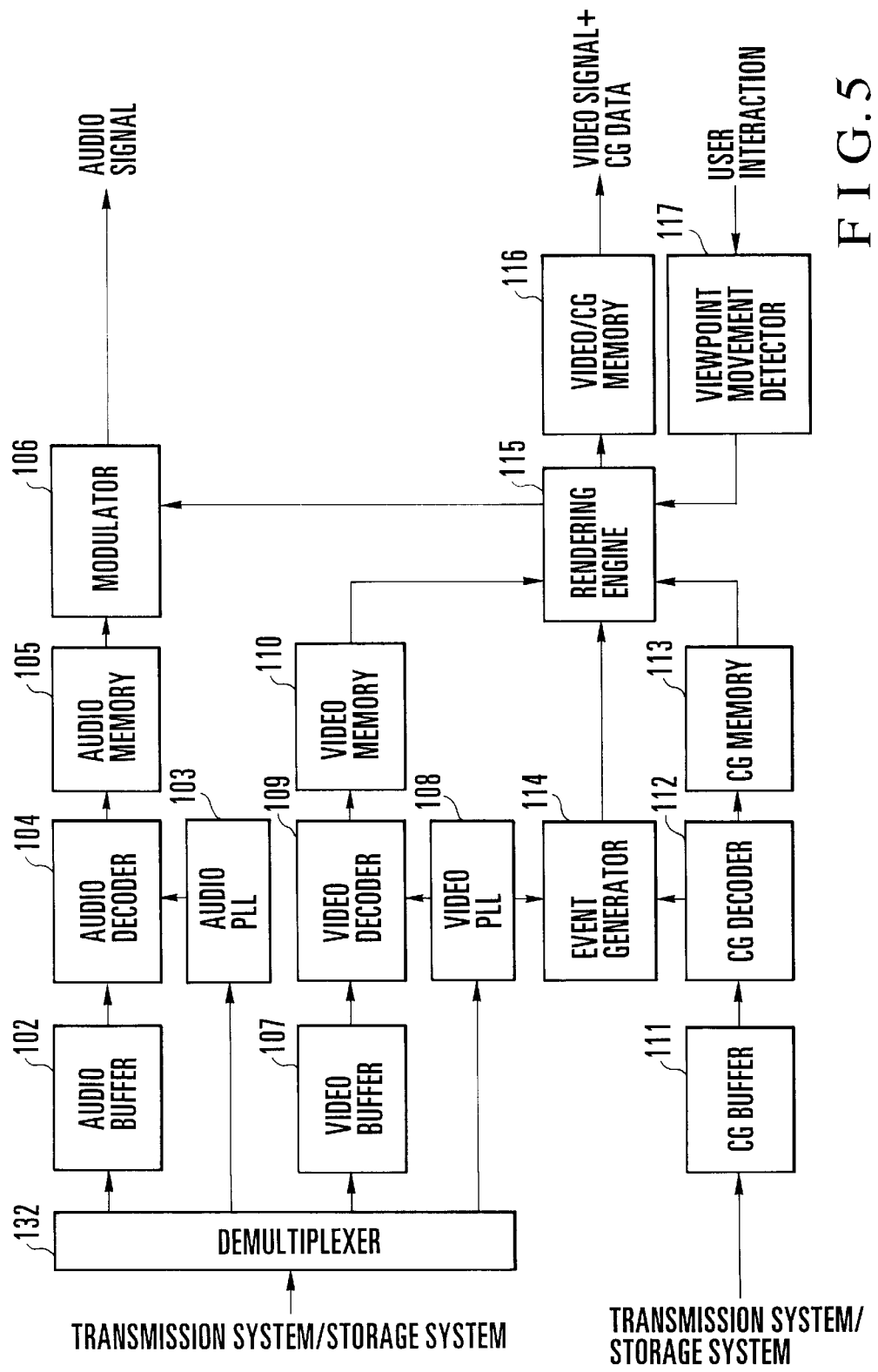
FIG. 5 is a block diagram of a synchronous reproducing/ synthesizing system according to the fifth embodiment of the present invention.

FIG. 5 shows the system configuration of the fifth embodiment of the present invention. The same reference numeral as in FIG. 1 denote the same elements in FIG. 5, and a detailed description thereof will be omitted. The difference from the first embodiment will be mainly described below.

In the system of the fifth embodiment shown in FIG. 5, the demultiplexer 101 in the first embodiment shown in FIG. 1 is replaced by a demultiplexer 132.

In the system shown in FIG. 5, the demultiplexer 132 separates compressed audio and video signal streams corresponding to the existing MPEG into a compressed audio signal stream, a time stamp, the SCR or PCR of the audio signal, a compressed video signal stream, a time stamp, and the SCR or PCR of the video. Computer graphics data is fetched by a CG buffer 111 via a route different from that of the compressed streams.

The fifth embodiment is advantageous in that the existing MPEG system and VRML system are fused without being changed, and synchronous reproduction is realized, unlike the first embodiment. The remaining operations are the same as those of the first embodiment, and a detailed description thereof will be omitted.

[Sixth Embodiment]

Figure 6:
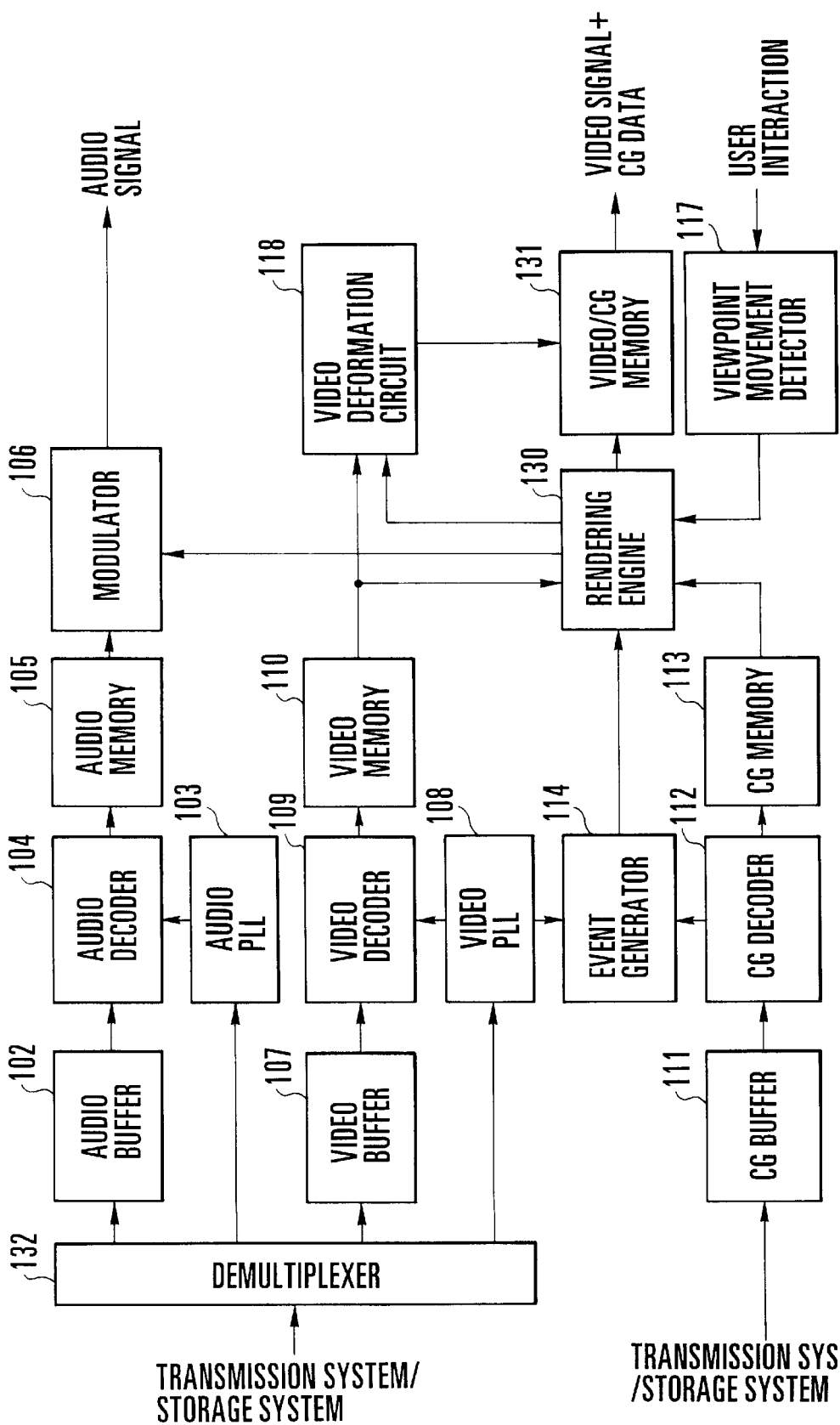
FIG. 6 is a block diagram of a synchronous reproducing/ synthesizing system according to the sixth embodiment of the present invention.

FIG. 6 shows the system configuration of the sixth embodiment of the present invention. The same reference numeral as in FIG. 2 denote the same elements in FIG. 6, and a detailed description thereof will be omitted. The difference from the second embodiment shown in FIG. 2 will be mainly described below.

In the system of the sixth embodiment shown in FIG. 6, the demultiplexer 101 in the second embodiment shown in FIG. 2 is replaced by a demultiplexer 132.

The demultiplexer 132 separates compressed audio and video signal streams corresponding to the existing MPEG into a compressed audio signal stream, a time stamp, the SCR or PCR of the audio signal, a compressed video signal stream, a time stamp, and the SCR or PCR of the video. Computer graphics data is fetched by a CG buffer 111 via a route different from that of the compressed streams.

The sixth embodiment is advantageous in that the existing MPEG system and VRML system are fused without being changed, and synchronous reproduction is realized, unlike the second embodiment. The remaining operations are the same as those of the second embodiment, and a detailed description thereof will be omitted.

[Seventh Embodiment]

Figure 7:
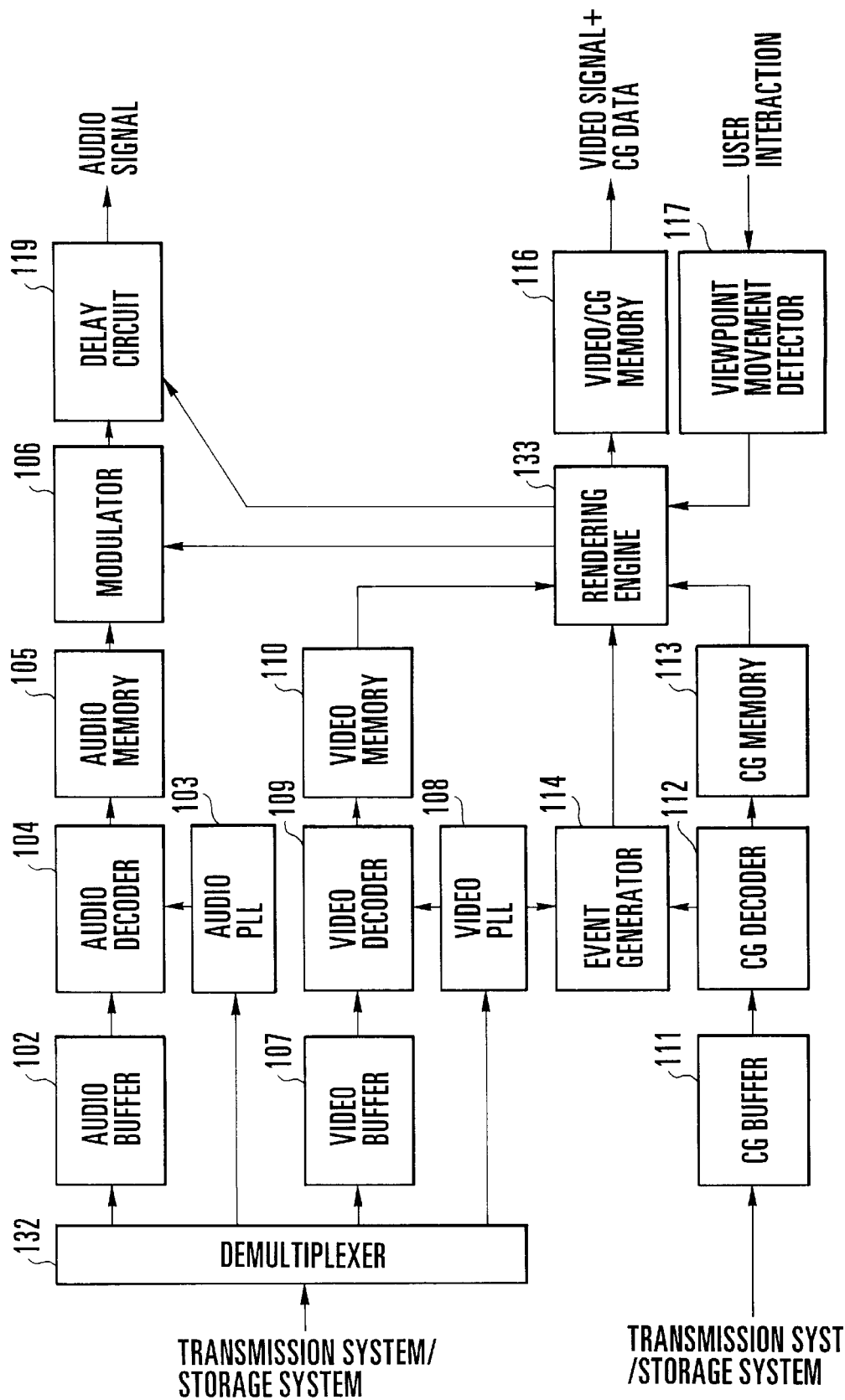
FIG. 7 is a block diagram of a synchronous reproducing/ synthesizing system according to the seventh embodiment of the present invention.

FIG. 7 shows the system configuration of the seventh embodiment of the present invention. The same reference numeral as in FIG. 3 denote the same elements in FIG. 7, and a detailed description thereof will be omitted. The difference from the third embodiment shown in FIG. 3 will be mainly described below.

In the system of the seventh embodiment shown in FIG. 7, the demultiplexer 101 in the third embodiment is replaced by a demultiplexer 132.

The demultiplexer 132 separates compressed audio and video signal streams corresponding to the existing MPEG into a compressed audio signal stream, a time stamp, the SCR or PCR of the audio signal, a compressed video signal stream, a time stamp, and the SCR or PCR of the video. Computer graphics data is fetched by a CG buffer 111 via a route different from that of the compressed streams.

The seventh embodiment is advantageous in that the existing MPEG system and VRML system are fused without being changed, and synchronous reproduction is realized, unlike the third embodiment. The remaining operations and advantages are the same as those of the third embodiment, and a detailed description thereof will be omitted.

[Eighth Embodiment]

Figure 8:
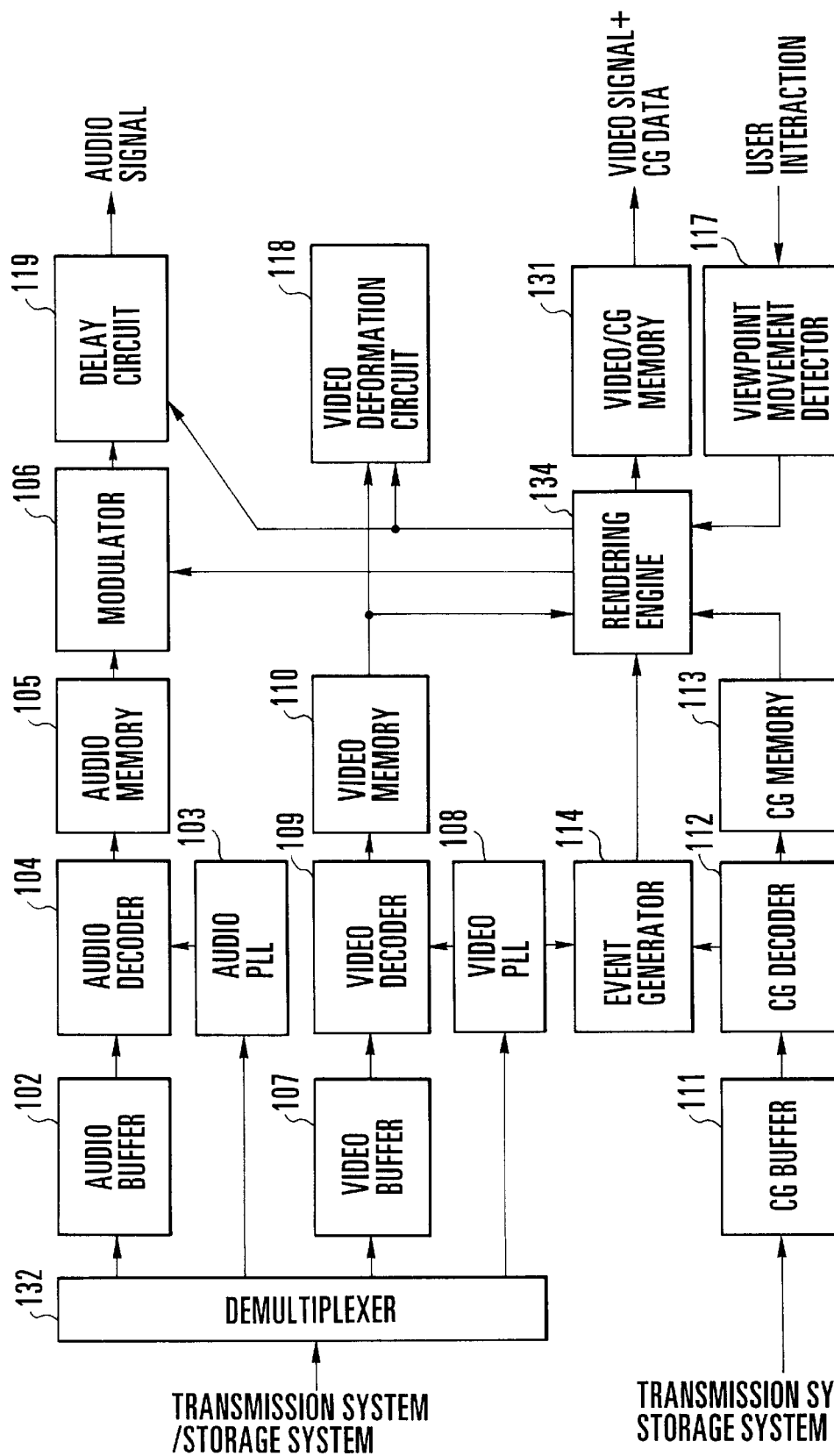
FIG. 8 is a block diagram of a synchronous reproducing/ synthesizing system according to the eighth embodiment of the present invention.

FIG. 8 shows the system configuration of the eighth embodiment of the present invention. The same reference numeral as in FIG. 4 denote the same elements in FIG. 8, and a detailed description thereof will be omitted. The difference from the fourth embodiment shown in FIG. 4 will be mainly described below.

In the system of the eighth embodiment shown in FIG. 8, the demultiplexer 101 in the fourth embodiment is replaced by a demultiplexer 132.

The demultiplexer 132 separates compressed audio and video signal streams corresponding to the existing MPEG into a compressed audio signal stream, a time stamp, the SCR or PCR of the audio signal, a compressed video signal stream, a time stamp, and the SCR or PCR of the video. Computer graphics data is fetched by a CG buffer 111 via a route different from that of the compressed streams.

The eighth embodiment is advantageous in that the existing MPEG system and VRML system are fused without being changed, and synchronous reproduction is realized, unlike the fourth embodiment. The remaining operations and advantages are the same as those of the fourth embodiment, and a detailed description thereof will be omitted.

As has been described above, according to the present invention, the following effects are obtained.

(1) The first effect of the present invention is that synchronous reproduction/synthesis of audio/video/computer graphics data is enabled from a compressed stream in which an audio signal, a video signal, and computer graphics data are multiplexed.

The reason for this is that, in the present invention, reference time information supplied from the coding system is also used as a time reference for the decoding system.

(2) The second effect of the present invention is that even when a rendering delay is generated, synchronous reproduction/synthesis of audio/video/computer graphics data is enabled from a compressed stream in which an audio signal, a video signal, and computer graphics data are multiplexed.

The reason for this is that, in the present invention, a video frame to be displayed at the current time is deformed using video signal deformation information obtained from an immediately preceding rendering result, and overwritten on the synthesized image.

(3) The third effect of the present invention is that even when a rendering delay is generated, synchronous reproduction/synthesis of audio/video/computer graphics data is enabled from a compressed stream in which an audio signal, a video signal, and computer graphics data are multiplexed.

The reason for this is that, in the present invention, the output of the audio signal is delayed in consideration of the rendering delay time to be expected.

(4) The fourth effect of the present invention is that even when a rendering delay is generated, synchronous reproduction/synthesis of audio/video/computer graphics data is enabled from a compressed stream in which an audio signal, a video signal, and computer graphics data are multiplexed.

The reason for this is that, in the present invention, a video frame to be displayed at the current time is deformed using video signal deformation information obtained from an immediately preceding rendering result, and overwritten on the synthesized image, and at the same time, the output of the audio signal is delayed in consideration of the rendering delay time to be expected.

(5) The fifth effect of the present invention is that synchronous reproduction/synthesis of audio/video/computer graphics data is enabled from a compressed stream in which an audio signal and a video signal are multiplexed and computer graphics data acquired via a different route.

The reason for this is that, in the present invention, reference time information supplied from the coding system is also used as a time reference for the decoding system.

(6) The sixth effect of the present invention is that even when a rendering delay is generated, synchronous reproduction/synthesis of audio/video/computer graphics data is enabled from a compressed stream in which an audio signal and a video signal are multiplexed and computer graphics data acquired via a different route.

The reason for this is that a video frame to be displayed at the current time is deformed using video signal deformation information obtained from an immediately preceding rendering result, and overwritten on the synthesized image.

(7) The seventh effect of the present invention is that even when a rendering delay is generated, synchronous reproduction/synthesis of audio/video/computer graphics data is enabled from a compressed stream in which an audio signal and a video signal are multiplexed and computer graphics data acquired via a different route.

The reason for this is that, in the present invention, the output of the audio signal is delayed in consideration of the rendering delay time to be expected.

(8) The eighth effect of the present invention is that even when a rendering delay is generated, synchronous reproduction/synthesis of audio/video/computer graphics data is enabled from a compressed stream in which an audio signal and a video signal are multiplexed and computer graphics data acquired via a different route.

The reason for this is that, in the present invention, a video frame to be displayed at the current time is deformed using video signal deformation information obtained from an immediately preceding rendering result, and overwritten on the synthesized image, and at the same time, the output of the audio signal is delayed in consideration of the rendering delay time to be expected.

What is claimed is:

1. An audio/video/computer graphics data synchronous reproducing/synthesizing system comprising:

separation means for separating a bit stream in which an audio signal, a video signal, and computer graphics data are compressed and multiplexed, into a compressed audio signal stream, an audio signal time reference value, a compressed video signal stream, a video signal time reference value, and a compressed computer graphics data stream;

first clock generation means for generating a first decoding clock on the basis of the audio signal time reference value from said separation means;

first decoding means for decoding the audio signal from the compressed audio signal stream from said separation means and the first decoding clock from said first clock generation means;

first storage means for storing the decoded audio signal from said first decoding means;

modulation means for modulating the audio signal from said first storage means in accordance with sound source control information;

second clock generation means for generating a second decoding clock on the basis of the video signal time reference value from said separation means;

second decoding means for decoding the video signal from the compressed video signal stream from said separation means and the second decoding clock from said second clock generation means;

second storage means for storing the decoded video signal from said second decoding means;

third decoding means for decoding the computer graphics data and event time management information from the compressed computer graphics data stream from said separation means;

third storage means for storing the decoded computer graphics data from said third decoding means;

event generation means for generating an event driving instruction on the basis of the second decoding clock from said second clock generation means and the event time management information from said third decoding means;

detection means for detecting viewpoint movement of an observer using a pointing device; and rendering means for receiving the video signal stored in said second storage means, the computer graphics data stored in said third storage means, the event driving instruction from said event generation means, and viewpoint movement data from said detection means, and outputting a synthesized image of the video signal and the computer graphics data and the sound source control information used by said modulation means.

2. An apparatus according to claim 1, further comprising:

first buffer means for buffering the compressed audio signal stream from said separation means and outputting the compressed audio signal stream to said first decoding means;

second buffer means for buffering the compressed video signal stream from said separation means and outputting the compressed video signal stream to said second decoding means; and third buffer means for buffering the compressed computer graphics data stream from said separation means and outputting the compressed computer graphics data stream to said third decoding means.

3. An apparatus according to claim 1, further comprising fourth storage means for storing the synthesized image of the video signal and the computer graphics data from said rendering means.

4. An apparatus according to claim 3, further comprising
video deformation means for deforming the video signal from said second storage means on the basis of two-dimensional projection information of an object, and wherein
said rendering means outputs the two-dimensional projection information of said object on which the video signal is mapped to said video deformation means, and
said fourth storage means overwrites the deformed video signal from said video deformation means on the synthesized image of the video signal and the computer graphics data from said rendering means and stores the synthesized image.

5. An apparatus according to claim 1, further comprising delay means for delaying the modulated audio signal from said modulation means.

6. An audio/video/computer graphics data synchronous reproducing/synthesizing system comprising:
separation means for separating a bit stream in which an audio signal and a video signal are compressed and multiplexed, into a compressed audio signal stream, an audio signal time reference value, a compressed video signal stream, and a video signal time reference value;
first clock generation means for generating a first decoding clock on the basis of the audio signal time reference value from said separation means;
first decoding means for decoding the audio signal from the compressed audio signal stream from said separation means and the first decoding clock from said first clock generation means;
first storage means for storing the decoded audio signal from said first decoding means;
modulation means for modulating the audio signal from said first storage means in accordance with sound source control information;
second clock generation means for generating a second decoding clock on the basis of the video signal time reference value from said separation means;
second decoding means for decoding the video signal from the compressed video signal stream from said separation means and the second decoding clock from said second clock generation means;
second storage means for storing the decoded video signal from said second decoding means;
third decoding means for decoding computer graphics data and event time management information from a compressed computer graphics data stream which is not multiplexed with the compressed audio arid video signal streams;
third storage means for storing the decoded computer graphics data from said third decoding means;
event generation means for generating an event driving instruction on the basis of the second decoding clock from said second clock generation means and the event time management information from said third decoding means;
detection means for detecting viewpoint movement of an observer using a pointing device; and rendering means for receiving the video signal stored in said second storage means, the computer graphics data stored in said third storage means, the event driving instruction from said event generation means, and viewpoint movement data from said detection means, and outputting a synthesized image of the video signal and the computer graphics data and the sound source control information used by said modulation means.

7. An apparatus according to claim 6, further comprising:
first buffer means for buffering the compressed audio signal stream from said separation means and outputting the compressed audio signal stream to said first decoding means;
second buffer means for buffering the compressed video signal stream from said separation means and outputting the compressed video signal stream to said second decoding means; and
third buffer means for buffering the compressed computer graphics data stream which is not multiplexed with the compressed audio and video signal streams.

8. An apparatus according to claim 6, further comprising fourth storage means for storing the synthesized image of the video signal and the computer graphics data from said rendering means.

9. An apparatus according to claim 8, further comprising
video deformation means for deforming the video signal from said second storage means on the basis of two-dimensional projection information of an object, and wherein
said rendering means outputs the two-dimensional projection information of said object on which the video signal is mapped to said video deformation means, and
said fourth storage means overwrites the deformed video signal from said video deformation means on the synthesized image of the video signal and the computer graphics data from said rendering means and stores the synthesized image.

10. An apparatus according to claim 6, further comprising delay means for delaying the modulated audio signal from said modulation means.

11. An audio/video/computer graphics data synchronous reproducing/synthesizing method, comprising the steps of:
separating a bit stream in which an audio signal, a video signal, and computer graphics data are compressed and multiplexed, into compressed audio and video signal streams, audio and video signal identification reference values, and a compressed computer graphics data stream;
generating a signal clock from the audio and video identification reference values;
decoding the audio and video signals from the compressed audio and video signal streams; respectively, using the generated signal clock,
decoding event time reference information from the compressed computer graphics data stream, and
generating an event driving instruction from the generated signal clock and the decoded event time reference information to synchronize a synthesized image of the video signal and the computer graphics data with the audio signal.

* * * * *